March 11, 1958  A. B. OSBORN  2,826,385
PIPE-SUPPORTING CLAMP
Filed Jan. 31, 1955
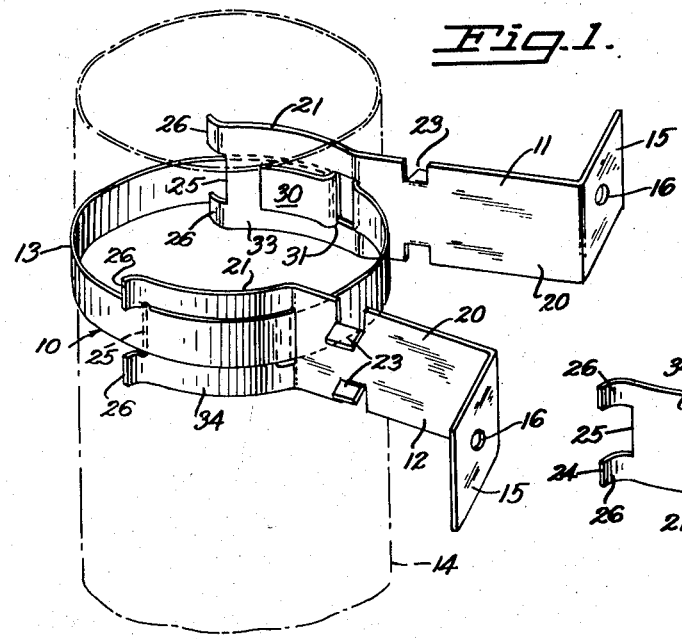
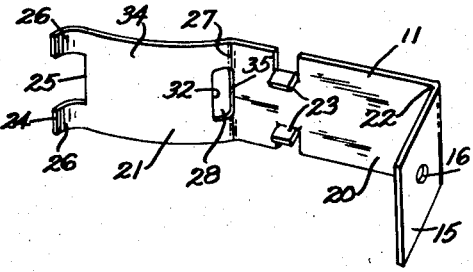
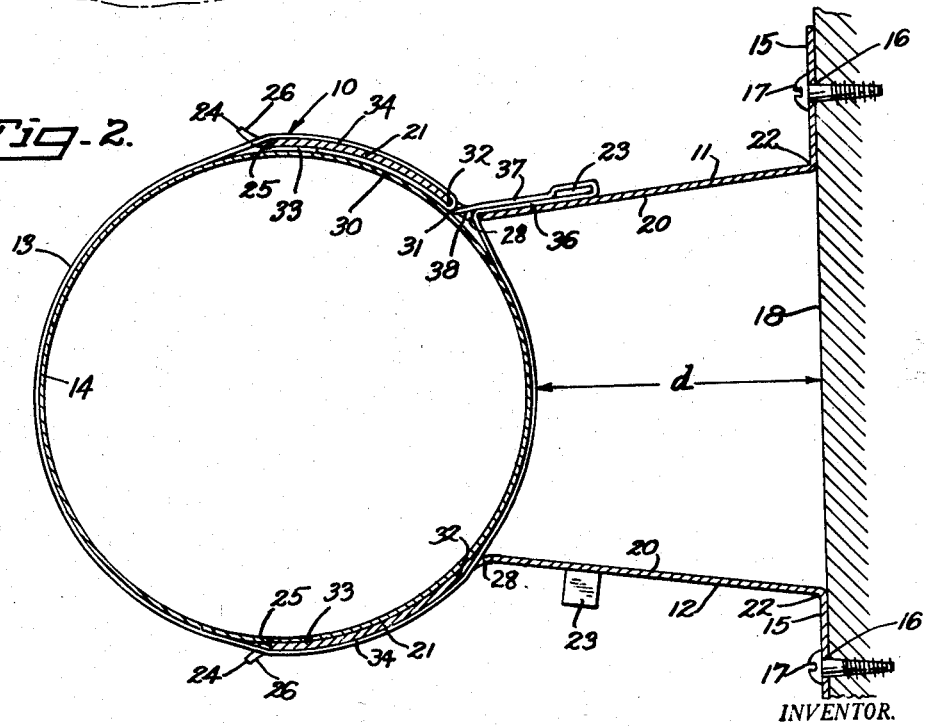
INVENTOR.
ABRAM B. OSBORN
BY
ATTORNEY

United States Patent Office 2,826,385
Patented Mar. 11, 1958

2,826,385

PIPE-SUPPORTING CLAMP

Abram B. Osborn, Oakland, Calif., assignor to Irving Gaynor and Mory Silberman, both of Oakland, Calif.

Application January 31, 1955, Serial No. 485,198

4 Claims. (Cl. 248—74)

This invention relates to a pipe-supporting clamp of the type which holds a metal flue pipe or similar pipe at a spaced distance away from a wall.

This invention solves the problem of accommodating the large variation in sizes found in flue pipes and makes it possible to take care of all sizes with one clamp assembly. Since the heating contractor can get along with only one size of clamp, he can carry the necessary numbers of clamps wherever he goes and does not have to stock a large variety of such clamps, as he has had to heretofore.

The invention also has as an object the provision of a pipe-supporting clamp that is easy to use and that saves time in installing flue systems.

Other objects and advantages of the invention will appear from the following description of a preferred form thereof, presented in accordance with 35 U. S. C. 112 but without any intention of limiting the invention narrowly to the details disclosed.

In the drawings:

Fig. 1 is a view in perspective of a pipe clamp embodying the principles of this invention, shown installed around a pipe, the pipe being shown in phantom in dot-dash lines.

Fig. 2 is an enlarged view in elevation and in section of the clamp assembly of Fig. 1, showing it installed on a wall to hold the pipe at the desired distance.

Fig. 3 is a view in perspective of one of the two identical bracket members which, together with a flexible strap, are the elements of the clamp assembly.

The clamp 10 shown in the drawings comprises three elements: two identical bracket members 11 and 12, and a flexible metal band 13. The band or strap 13 may be cut to length at the time of installation from a long roll or strip of material, the length of the strip being normally about two or three inches longer than the circumference of the pipe 14. If only one size of pipe is used by the contractor, the strips may be cut to length ahead of time, but the flexible strap 13 when combined with the brackets 11 and 12, makes it possible for one size of clamp 10 to accommodate practically any size of flue pipe 14.

The brackets 11 and 12 are preferably identical so that only one kind of bracket need be carried in stock—two elements in all to the assembly.

The bracket 11 (or 12) shown in perspective in Fig. 3 comprises a metal strip more rigid than the flexible metal strap 13. The single strip is punched and bent to a general shape, which in cross section roughly resembles an L with a curved portion at the top of the L. The flat wall-engaging base portion 15 of the L has an opening 16 through which the screw or nail 17 passes to secure the bracket 11 (or 12) to the wall 18, as shown in Fig. 2.

The leg of the L-shaped bracket 11 (or 12) is a straight spacing portion 20 which connects the wall-engaging portion 15 to a curved portion 21 that engages the wall of the pipe 14. This pipe-spacing portion 20 preferably meets the wall-engaging portion 15 at an obtuse angle 22, nearly a right angle, to give the workman more room to use his screwdriver or hammer. Tabs 23, 23 are partially cut from the portion 20 and bent out approximately perpendicular thereto for use in a manner later described to secure one end of the strap 13 to one of the brackets 11 or 12. The length of the straight portion 20 determines the distance $d$ the pipe 14 is to be spaced from the wall 18 (see Fig. 2).

The arcuate portion 21 engages the pipe 14 and also positions the strap 13 on both brackets 11 and 12. At its open, outboard, end 24 a guide slot 25 is punched out leaving guiding flanges 26, 26 on each side. At the intersection 27 of the arcuate portion 21 and the straight spacing portion 20—the inboard end of the arcuate portion 21—an opening 28, preferably rectangular in shape is punched out for use in connection with the strap 13, in a manner about to be described.

In securing the clamp 10 around the pipe 14, the strap 13 is first cut to the desired length and then one end portion 30 about one inch long is bent back sharply at 31 and is passed through the hole 28, so that it lies between the pipe 14 and the inside face 33 of the arcuate portion 21. The bend 31 bears against outer edge 32 of the opening 28. The strap 13 outside the opening 28 rests on top of the arcuate portion 21 and passes out between the guide tabs 26 through the guide slot 25 into direct engagement with the pipe 14. The strap 13 then encircles the major portion of the pipe 14, and passes through the guide slot 25 between the guide tabs 26 of the other bracket 12. It encircles the outer face 34 of the bracket 12 and passes through its opening 28. From there the strap 13 passes around the remainder of the pipe 14 and then passes out through the opening 28 of the bracket 11, from the inside to the outside. The strap 13 is pulled tight enough to hold the pipe 14 snugly and then is bent into firm engagement with the inner edge 35 of the opening 28. The remaining portion 36 of the strip 13 is pulled up along the spacing portion 20 of the bracket in between the tabs 23, which are then substantially perpendicular to the straight portion 20. The tabs 23 are then crimped down firmly onto the strap portion 36 and the strap cannot thereafter be withdrawn without bending the tabs 23 out again. The portion 37 of the strap 13 is then bent back over the tabs 23, and the loose end 38 may be tucked into the opening 28.

Once the clamp 10 is on the pipe 14, the clamp 10 can be installed on the wall 18. If the angle 22 between the wall-supporting portion 15 and the pipe-spacing portion 20 is obtuse, as preferred, the use of a screw driver or hammer is more convenient.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. In a pipe-supporting clamp for holding a pipe at a spaced distance from a wall, a bracket adapted to be used in combination with an identical bracket and a flexible metal band, said bracket comprising thin strip metal of uniform width bent to provide a wall-engaging portion having means enabling the securing of said portion to the wall, a spacing portion extending out from said wall-engaging portion and having a pair of guide tabs partially cut out and bent out from its side edges, and an arcuate pipe-engaging portion extending out from the outboard end of the spacing portion, said arcuate portion being provided at its inboard end with an opening therethrough and at its outboard end with an open slot.

2. In a pipe-supporting clamp for holding a pipe at a spaced distance from a wall, a bracket adapted for use in combination with another substantially identical bracket and a flexible metal band, said bracket comprising a unitary thin strip metal member of uniform width having a wall-engaging portion provided with an opening adapted to receive fastening means for securing said portion to the wall, a spacing portion bent out from said wall-engaging portion at an obtuse angle thereto and having two pairs of lateral cuts providing a pair of guide tabs bent out from its side edges, and an arcuate pipe-engaging portion extending out from the outboard end of the spacing portion, said arcuate portion being provided at its inboard end with a generally rectangular opening therethrough one edge lying along the junction with said spacing portion, and at its outboard end with an open slot.

3. A pipe-supporting clamp for holding a pipe at a spaced distance from a wall, including in combination a pair of substantially identical brackets and a flexible metal band, said brackets comprising a wall-engaging portion having means enabling the securing of said portion to the wall, a spacing portion extending out from said wall-engaging portion and having a pair of guide tabs extended out from its side edges, and an arcuate pipe-engaging portion extending out from the outboard end of the spacing portion, said arcuate portion having an inside face and an outside face and being provided at its inboard end with an opening therethrough and at its outboard end with an open slot; one end portion of the metal band extending through the opening in one bracket and disposed against the inside face thereof, the remaining portion of the band being disposed against the outside face of the arcuate portion of said one bracket, through the open slot, into engagement with the pipe, through the open slot of the other bracket, around the outside face of the arcuate portion thereof, through its opening, around the remainder of said pipe, through the opening of the first said bracket, the other end of said band engaging the wall of the spacing portion between said tabs, said tabs overlying and engaging the other end portion to hold said other end portion securely in place.

4. A pipe-supporting clamp for holding a pipe at a spaced distance from a wall, including in combination a pair of substantially identical brackets and a flexible metal band, each of said brackets comprising a unitary metal strap cut from material of uniform width and bent to provide a wall-engaging portion provided with an opening adapted to receive fastening means for securing said portion to the wall, a spacing portion extended out from said wall-engaging portion at an obtuse angle thereto and having two pairs of lateral cuts providing a pair of guide tabs extended out from its side edges, and an arcuate pipe-engaging portion extending out from the outboard end of the spacing portion, said arcuate portion being provided at its inboard end with a generally rectangular opening therethrough, one edge lying along the junction with said spacing portion, and at its outboard end with an outwardly flared portion having an open slot; one end portion of said metal strap extending through the rectangular opening of one bracket, said strap passing from said opening against the outside of the arcuate portion of said one bracket, through the open slot thereof into engagement with the pipe, through the open slot of the other bracket, over the outside of the arcuate portion thereof, through its rectangular opening, around the remainder of the pipe, through the rectangular opening of the first said bracket, the other end of said band engaging the wall along the spacing portion between said tabs, said tabs overlying and engaging said other end portion to hold it securely in place and the strap overlying and engaging said tabs and tucked into said rectangular opening.

References Cited in the file of this patent

UNITED STATES PATENTS

| 622,199 | Bookhout | Apr. 4, 1899 |
| 875,533 | Lane | Dec. 31, 1907 |
| 883,673 | Shepard | Mar. 31, 1908 |
| 928,711 | Taft | July 20, 1909 |
| 2,443,591 | Banks | June 22, 1948 |

FOREIGN PATENTS

| 51,991 | Germany | of 1890 |